United States Patent [19]

Guérin

[11] Patent Number: 4,827,490
[45] Date of Patent: May 2, 1989

[54] METHOD OF SYNCHRONIZING TWO BINARY TRAINS

[75] Inventor: François Guérin, Poitiers, France

[73] Assignee: Alcatel Thomson Faisceaux Hertziens, Levallois Perret, France

[21] Appl. No.: 63,556

[22] Filed: Jun. 18, 1987

[30] Foreign Application Priority Data

Jun. 18, 1986 [FR] France .................................. 86 08805

[51] Int. Cl.⁴ .............................................. H04L 7/00
[52] U.S. Cl. ..................................... 375/111; 275/119
[58] Field of Search ............... 375/108, 111, 119, 120; 271/42, 46, 47; 455/133, 135, 136; 340/825.01, 825.02

[56] References Cited

U.S. PATENT DOCUMENTS

| | | | |
|---|---|---|---|
| 4,551,845 | 11/1985 | Ad der Halden et al. | 375/108 X |
| 4,651,103 | 3/1987 | Grimes | 375/108 X |
| 4,694,294 | 9/1987 | Suzuki et al. | 340/825.2 X |

FOREIGN PATENT DOCUMENTS

2569323 2/1986 France .

OTHER PUBLICATIONS

Patents Abstracts of Japan, vol. 9, N° 284, (E-357) 2007, Nov. 12, 1985, & JP-A-60 125 031 (Fujitsu K. K.) 04.07.1985.

Primary Examiner—Derek S. Jennings
Attorney, Agent, or Firm—Sughrue, Mion, Zinn, Macpeak and Seas

[57] ABSTRACT

A method and apparatus applicable to digital transmission by microwave beams. The method and apparatus serving to synchronize two binary trains (T1, T2) in order to switch from the first train to the second, with a synchronization range being used which extends between a first position in a buffer memory storing the train which is directed to the output and for which reading follows writing by one bit period (case A), to a second position where reading precedes writing by one bit period (case B).

10 Claims, 10 Drawing Sheets

METHOD OF SYNCHRONIZING TWO BINARY TRAINS

The invention relates to a method of synchronizing two binary trains in order to switch from one train to the other, and to apparatus for implementing the method.

BACKGROUND OF THE INVENTION

In digital microwave beam transmissions, the bit error rate is measured in order to estimate the quality of a link. If the quality is bad, the information is sent over a backup channel. It then becomes important not to degrade the content of the message when switching from the normal channel to the backup channel.

Since the quality of a link deteriorates relatively slowly, advantage is taken of the breathing space to attempt to put the pulse train of the backup channel into synchronization with the train of the channel which is deteriorating. Once this has been done, a switchover is performed without the user being aware of it.

The invention seeks to increase the range over which two such binary trains can be synchronized.

SUMMARY OF THE INVENTION

To this end, the invention provides a method of synchronizing two binary trains in order to switch from the first train to the second, wherein a synchronization range is used which extends between a first position in a buffer memory storing the train which is directed to the output and for which reading follows writing by one bit period, to a second position where reading precedes writing by one bit period.

More precisely, the invention provides a method comprising the following steps:

comparing phases between the clocks associated with the two trains by means of a phase comparator, said comparison taking place in a state where reading follows or precedes writing by one position in the buffer memory for the train which is directed to the output;

seeking synchronization by inhibiting the second train or else passing to the second position for reading relative to writing by modifying the phase comparator and returning to the preceding step;

switching from the first train to the second train if synchronization is obtained after N shifts in the buffer memory; and switching from the first train to the second train if synchronization is not found after searching for a determined length of time.

The invention also provides apparatus for implementing the method, said apparatus comprising two buffer memories having N positions each and in which the two trains are stored, two write inhibit devices in said memories, a synchronization logic circuit, a phase lock loop which includes a phase comparator, a low pass filter, a voltage controlled oscillator, and a divide-by-N circuit fed back to a first input of the phase comparator, the second input of the comparator being connected via a first switch to one of the clocks associated with the two trains after passing through two divide-by-N circuits. It also enables bit-by-bit comparison of the binary trains by means of an exclusive-OR gate which receives the binary trains read from the two buffer memories and which is connected to the synchronization logic circuit. A second output switch serves to direct one of said trains as read to the output. The synchronization logic is connected to both write inhibit devices to both switches, and to the phase compatator.

Advantageously, the apparatus includes at least one delay device disposed between the divide-by-N circuit of the phase loop and the phase comparator.

BRIEF DESCRIPTION OF THE DRAWINGS

Embodiments of the invention are described by way of example with reference to the accompanying drawings, in which.

DETAILED DESCRIPTION OF THE INVENTION

Figure 1:
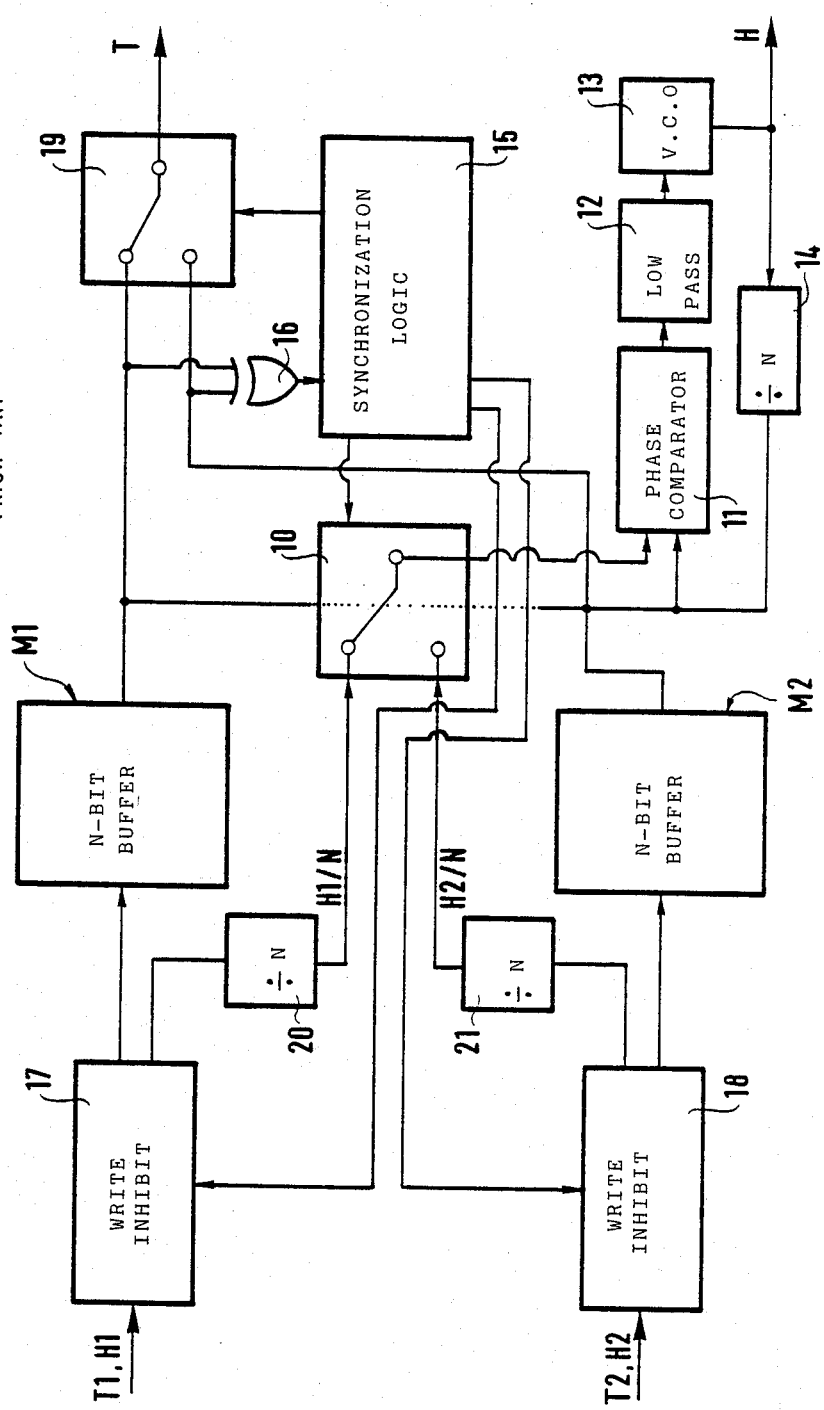
FIG. 1 is a block diagram of prior art apparatus for switching from one binary train to another.

The apparatus shown in FIG. 1 is used for switching from a normal channel T1 associated with a clock H1 to a backup channel T2 associated with a clock H2. It comprises two N-bit buffer memories M1 and M2 which are written to under the control of the clocks H1 and H2, and which are read from by a clock Hlec which is locked to one of the write clocks H1 or H2 by means of a phase lock loop.

A switch 10 has input signals constituted by the clocks H1/N and H2/N obtained at the outputs from two divide-by-N circuits 20 and 21. One of these input signals is applied via the switch 10 to the phase lock loop which comprises a phase comparator 11, a low pass filter 12, a voltage controlled oscillator 13 (VCO), and a divide-by-N circuit 14. A synchronization logic circuit 15 associated with an exclusive-OR gate 16 serves to control the write inhibit circuit 17 or 18 of the channel which is not being used for output. The output binary train is selected by means of a switch 19. It is associated with the clock H obtained in the phase lock loop.

In operation, the offset between the two binary trains, i.e. between the binary train of the normal channel T1 under consideration and the binary train of the backup channel T2, is unknown: these two trains are identical, but one is shifted relative to the other by a lead or a lag of X bits. They operate at the same clock rate.

In order to synchronize these two incident binary trains, both of the binary trains T1 and T2 are written into respective N-bit buffer memories M1 and M2. These memories are constituted by N D-type bistables. Synchronization over a certain range can be obtained by inhibiting writing of one or other of the two trains.

Then, the clock Hlec is used to read from same address memory cells in both buffer memories M1 and M2. By inhibiting writing in that one of the channels which is not directed to the binary output (i.e. channel 2 in FIG. 1), it is possible to shift the corresponding binary train relative to the other.

The exclusive-OR gate 16 performs a bit-by-bit comparison between the two trains read from the memories M1 and M2 over a certain period of time. If the number of errors is high, writing is again inhibited.

In contrast, if both trains are identical, it becomes possible to switch over. The switchover takes place in two stages: since the shifts in the buffer memories are by integer numbers of bits, the first stage consists in a phase switchover in which the input to the phase comparator 11 is switched over to the write clock H2 of the channel T2 which is going to be used. In a second stage, the output binary train is switched over. This switchover takes place after the clock phase has caught up with a portion of the distance to be run.

Figure 2:
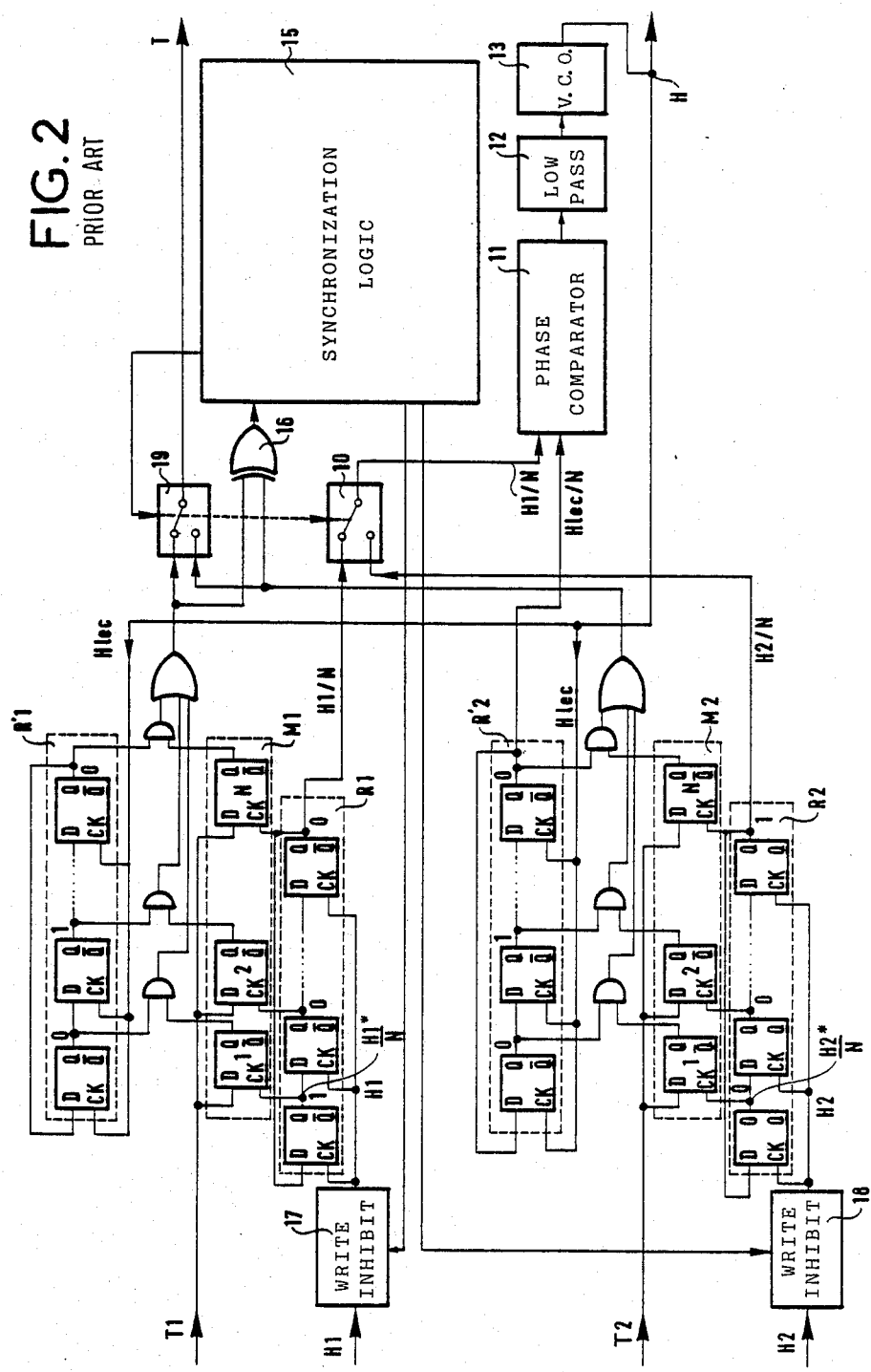
FIG. 2 is a more detailed diagram of the apparatus shown in FIG. 1.

FIG. 2 shows the N D-type bistables constituting the buffer memory M1 corresponding to the first channel T1. It also shows the N bistables which determine the write sequence in said buffer memory M1. This comprises a shift register R1 which is looped back on itself. It is initialized with a single "1" among N-1 "Os". Similarly, an N-bistable shift register R1' is used for reading. It too is initialized with a single "1" amongst N-1 "Os", however the position of the "1" is not the same as for writing. Similarly, there are two shift registers R2 and R2' corresponding to the second channel T2. The position of the "1" in the read sequencing register is the same for both channels: reading is performed simultaneously from same address memory cells in both buffer memories M1 and M2.

The trains T1 and T2 are applied simultaneously to all of the inputs of the various bistables constituting the memories M1 and M2, however they are stored only by those bistables which also have a rising edge on their clock inputs (CK).

It is not possible to write and to read simultaneously in the same buffer memory cell, since its content changes during writing.

The divided by N read clock (Hlec/N) and the write clock of the channel being used for output, also divided by N (i.e. H1/N), are both applied to respective inputs of the phase comparator 11. The channel 2 read shift register is used as the divide-by-N circuit in the phase lock loop.

In prior art methods, only one equilibrium position is used, whereby reading in each buffer memory M1 and M2 takes place in phase opposition with writing thereto, with N being even:

if writing to bistable 1, reading is performed from bistable $(N/2)+1$;

if writing to bistable 2, reading is performed from bistable $(N/2)+2$;

if writing to bistable N/2, reading is performed from bistable N; and if writing to bistable $(N/2)+1$, reading is performed from bistable 1.

Figure 3:
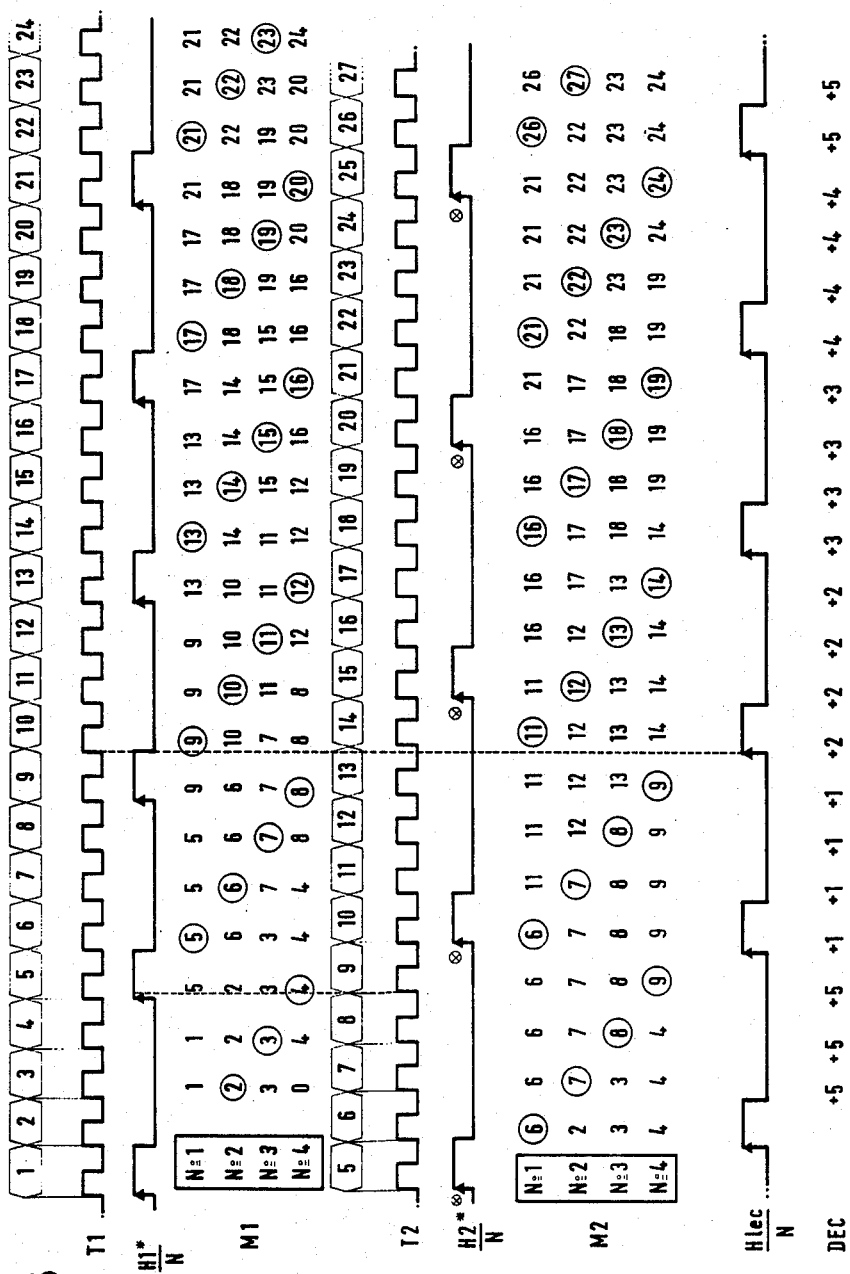
FIGS. 3 and 4 illustrate the operation of the apparatus shown in FIGS. 1 and 2.
Figure 4:
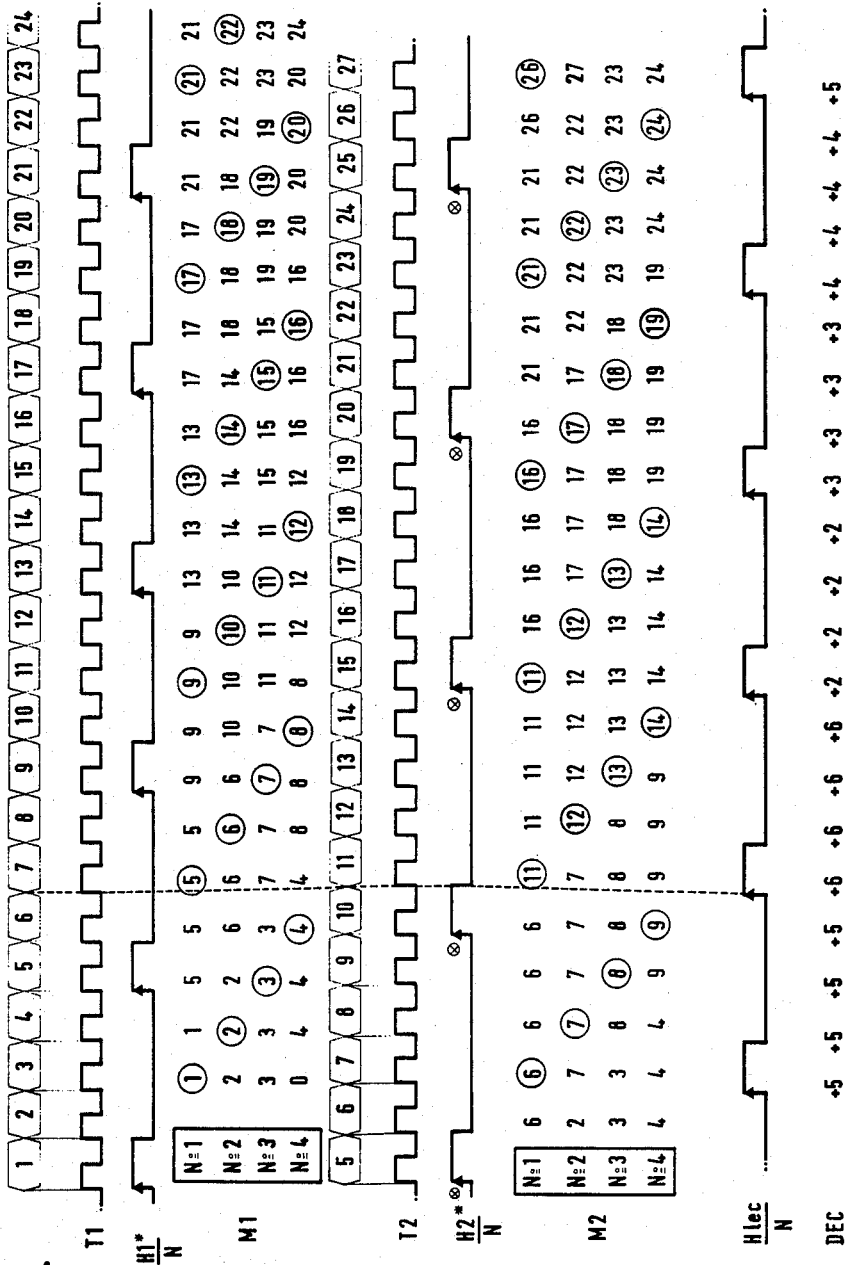

FIGS. 3 and 4 examine two special cases, where the read clock Hlec is respectively in quadrature and in phase opposition with the write clock H1 of the channel 1 being output.

The vertical dashed lines are marks for showing the offset between the two trains T1 and T2, and the phase difference between H1/N and Hlec/N.

The numbers in circles are the bits which are read and compared at the read clock rate Hlec.

The frequency at which the lock H2 is inhibited is exaggerated. Normally, once a shift has been performed, the two trains T1 and T2 are compared over a large number of bits.

Occasions on which the clock is inhibited are marked: ⊗. By way of example, FIG. 3 shows a shift X where $X=+4.25$ with $N=4$ and with the read clock Hlec/N being in quadrature with the clock $H1^*/N$ (taken at the output from the first bistable in M1).

The content of the memory M2 has a lead over the content of the memory M1.

It may be observed that the shift DEC between the trains T1 and T2 can be varied by an integer number of bits over the range $X-3$ to $X+1$ (with $X=4.25$ in this case) by clock jumps at the locations marked ⊗ (writing inhibited in the channel which is not being used). In the case shown, synchronization is never achieved since the shift between the two trains never passes through zero.

FIG. 4 shows a shift X where $X=+4.25$ with $N=4$ and with the read clock Hlec/N being in phase opposition with the clock $H1^*/N$ (taken at the output from the first bistable of M1).

In this case the content of the memory M2 leads relative to the memory M1.

It may be observed that the shift DEC between the trains T1 and T2 can now be made to vary by an integer number of bits over the range $X-2$ to $X+2$ by clock jumps at the points marked ⊗. Here again, synchronization is never achieved since the shift between the two trains read never passes through zero.

The method in accordance with the invention is no longer limited to a single equilibrium position for the phase lock loop, and it increases the synchronization range. If the phase offset between the write clock H1 of the channel being used and the read clock Hlec is fixed, the possible synchronization range is then theoretically equal to $N+1$ bits. (In practice the range is a little less since writing cannot be performed simultaneously with reading in the buffer memory, and also because of side effects, the real range is thus a little less than N bits).

Figure 5:
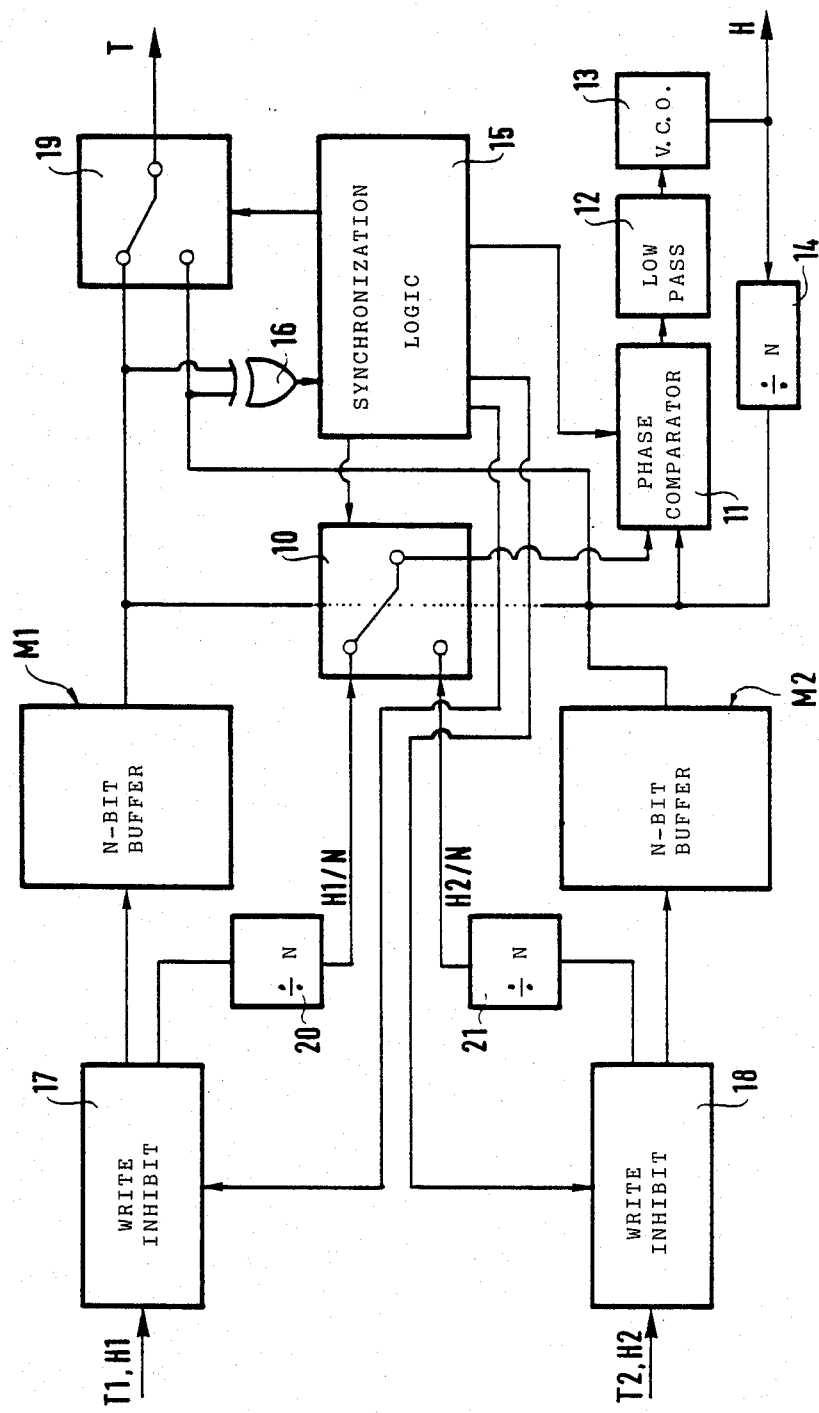
FIG. 5 is a block diagram of apparatus for implementing the method in accordance with the invention.

In contrast, in apparatus in accordance with invention, the synchronization logic may act on the comparator in the phase lock loop, as shown in FIG. 5 giving a synchronization range running from $X-N+1$ to $X+N-1$.

Figure 6:
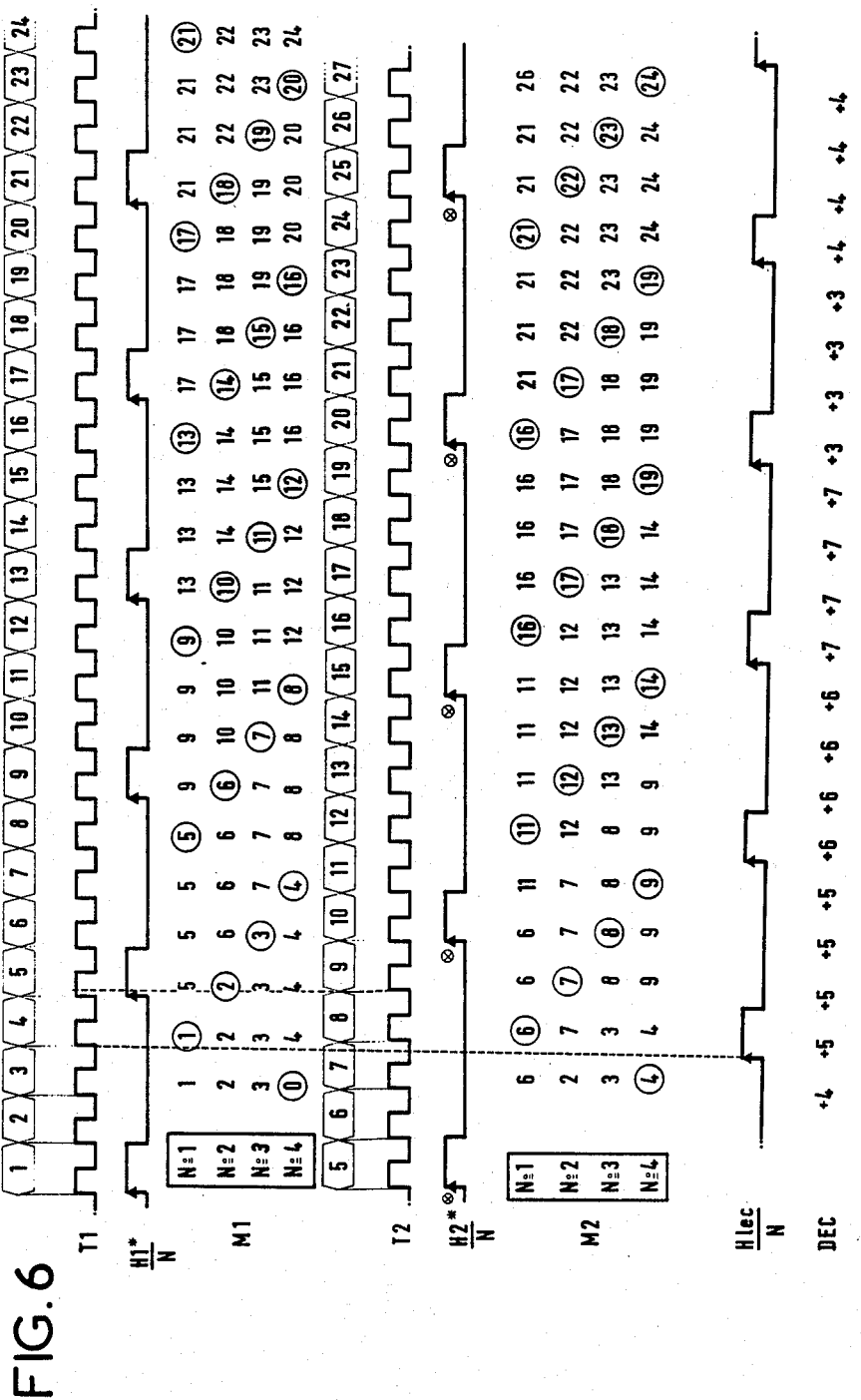
FIGS. 6, 7, 8, and 9 illustrate the method in accordance with the invention.

This can easily be verified by taking the example shown shown in FIG. 6 where $N=4$ and $X=+4.25$.

As shown above, if reading takes place with a lag of one bit relative to writing, the available synchronization range runs from $X-3$ to $X+1$.

In the example shown, the read clock Hlec/N has a lead of one bit relative to the write clock $H1^*/N$. This does indeed give rise to a synchronization range of $X-1$ to $X+3$. This result is also true for an N-bit buffer memory and any shift X between the trains.

The maximum synchronization range is thus obtained when reading takes place immediately before or after writing a bit in the channel being used: these two positions are respectively called "case A" and "case B" in the following description.

Figure 7:
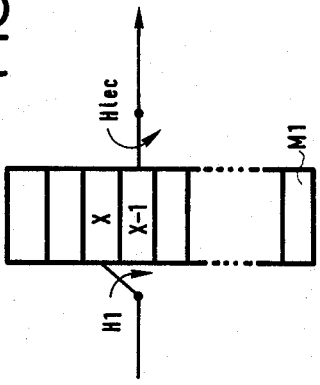
Figure 8:
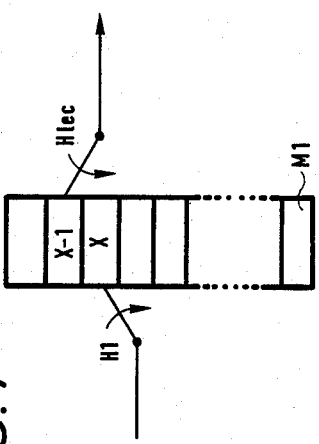

To pass from case A shown in FIG. 7 to case B shown in FIG. 8, reading must be slowed down, and conversely to pass from case B to case A, reading must be accelerated. Reading and writing cannot take place simultaneously at the same memory cell in the N-bit buffer memory.

It is possible to go from A to B, or vice versa, provided the read period is not varied too much when changing the phase offset between reading and writing. This occurs in a phase lock loop which integrates phase offsets. A second constraint is that the content of the binary message should not be modified by a phase jump and this also is true, as shown below by an example.

The channel which is not being used is irrelevant during phase jumping.

Figure 9:
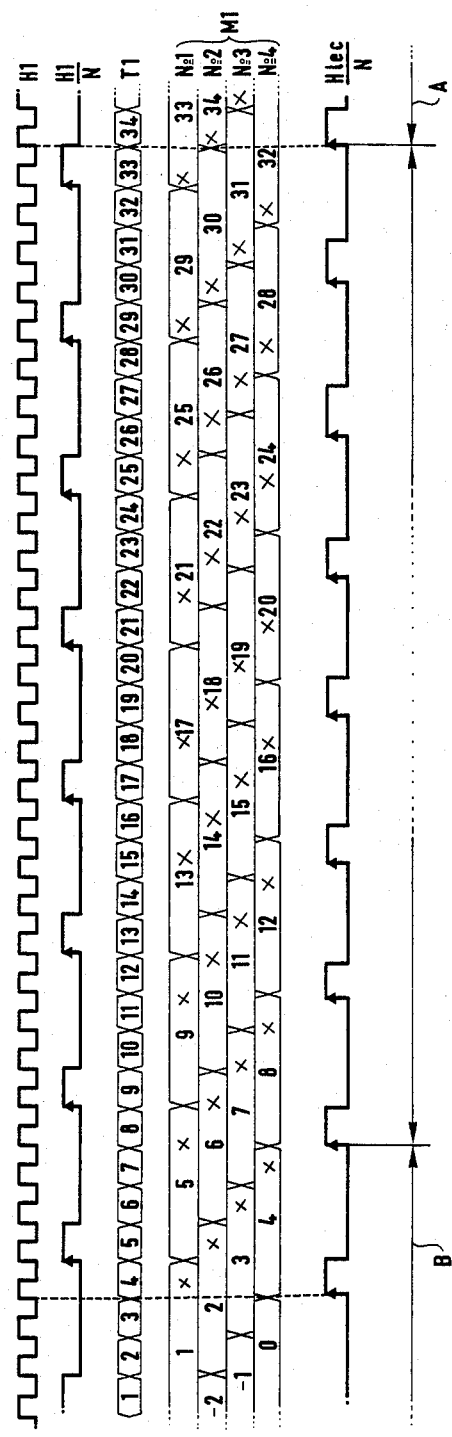

Take, by way of example, the passage from case B to case A in a 4-bit buffer memory. FIG. 9 shows the write clock H1, the write clock divided by N (H1/N), the incident binary train (for example T1) which is to be transmitted to the output without having its content changed, and the content of the four cells of the buffer memory. Crosses "x" indicate the instants at which the memory cells are read.

When jumping phase, the read clock is accelerated for the time taken by the phase lock loop to stabilize on position A. This has the effect of shortening the bit duration of the output train. The function of the phase lock loop is to integrate the phase jump over a sufficiently long period of time to ensure that the resulting jitter is acceptable by equipment downstream. In the diagram, this period of time is naturally very much shortened, and it may occur, in practice, over several thousand bits.

The diagram starts in position B, i.e. with reading taking place "one bit" before writing. This can be seen, inter alia, by the fact that the crosses occur immediately before content is loaded into the memory cells. The diagram ends in position A, after the phase jump where reading is taking place "one bit" after writing. The crosses are now immediately after the changes in value of the memory cells.

It can be seen that the content read from the cells is the same as it would have been if the clock had not been accelerated during the phase jump from B to A. The binary message has therefore not been changed.

It is also clear that when passing from case A to case B, the read instant as marked by "x" moves in the opposite direction. In this case, the read clock Hlec is slowed down. The content read from the memory cells is likewise unchanged by the phase jump: the binary message is not altered.

The method in accordance with the invention may thus comprise the following stages:

1—Compare phase in state A or B;

2—Attempt to obtain synchronization by inhibiting the channel which is not being used (e.g. T2 with writing to M2 being inhibited);

3—If after the N possible shifts synchronization is obtained, then switch suddenly from the in-service channel T1 to the backup channel T2, channel T2 becomes the output channel;

4—Otherwise change the state of the phase comparator and begin again at 2; and

5—If after a certain length of time synchronization has not been obtained, then switch from channel T1 to channel T2.

The method in accordance with the invention includes a variant which consists in inhibiting the clocks in alternation with small variations in the phase offset between reading and writing, for example within the limits $\Delta\phi = 2\pi/N$.

From the point of view of the phase lock loop, it is necessary to be able to act on the direction of frequency variation (quicker or slower) during the phase jump. It is also necessary to be able to act on the phase offset between the write clock (divided by N) and the read clock (divided by N) in the two equilibrium positions A and B.

Figure 10:
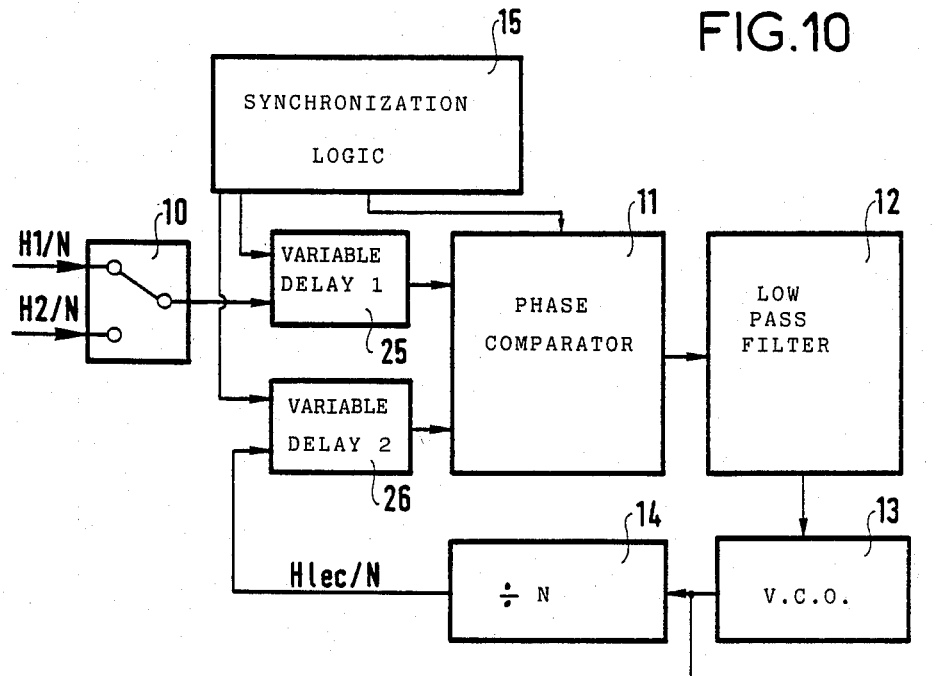
FIGS. 10 to 19 show different variant embodiments of the apparatus for implementing the method in accordance with the invention together with the operation of the said variants.
Figure 11:
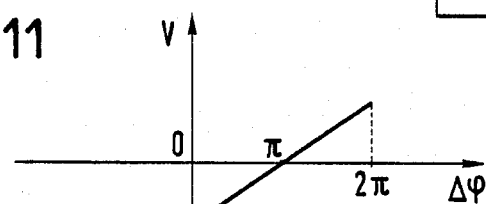

As shown in FIG. 10, a first solution consists in using a phase comparator centered on $\Delta\phi = \pi$, as shown in FIG. 11, together with two variable delays such that the phase jump (A←→B) is obtained in two stages using the two devices 25 and 26 for obtaining two variable delays 1 and 2.

Figure 12:
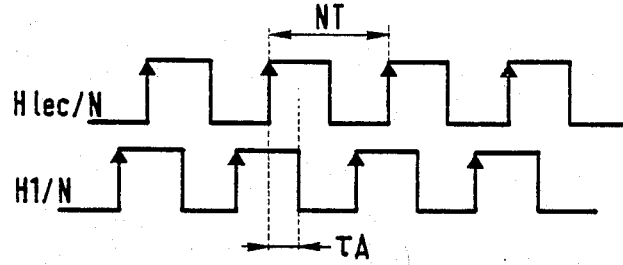

In case A as shown in FIG. 12, the read clock divided by N should lag one bit behind the write clock divided by N. There is thus an offset between equilibrium and Hlec/N of $\tau_A = T(N/2 - 1)$, where N is even. The delay 1 is equal to $\tau_A$ and the delay 2 is equal to zero. The delay 1 is applied to the write clock.

Figure 13:
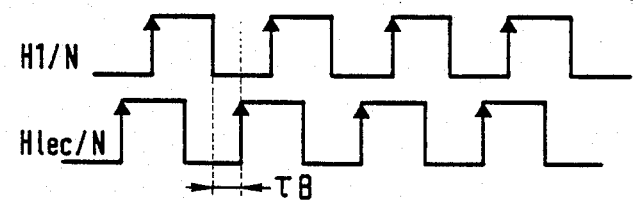

Similarly, in case B as shown in FIG. 13, $\tau_B = T(N/2 - 1)$.

The delay is now applied to the read clock. The delay 2 is equal to $\tau_B$ and the delay 1 is equal to zero.

In this embodiment the delays 1 and 2 have the same values of zero and $T(N-2)/2$. The delays 1 and 2 must be switched over successively and not simultaneously in order to ensure that the phase jumps $\Delta\phi = 2\pi(N-1)/2N$, or else a phase comparator operating over a range of $4\pi$ must be used.

Figure 14:
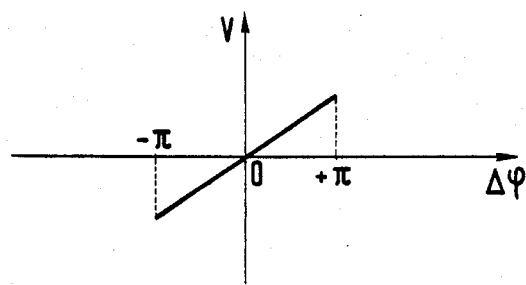

In a second solution a phase comparator is used having the response curve shown in FIG. 14.

The phase jump takes place in two stages. It is split into two equal halves: and the system waits until it is fairly close to equilibrium before performing the second phase jump.

Figure 15:
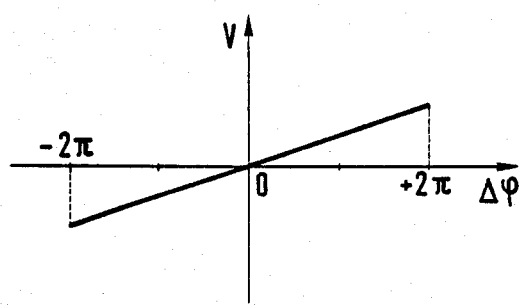
Figure 16:
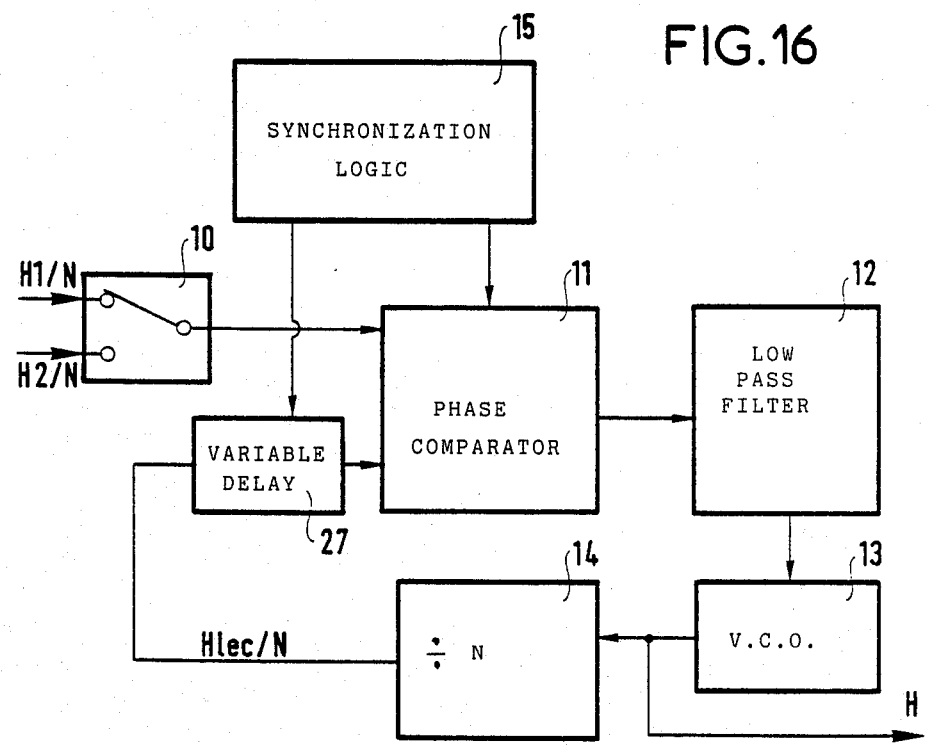

In a third solution, a phase comparator centered on $\Delta\phi = 0$ as shown in FIG. 15 is used together with a single variable delay 27 as shown in the block diagram of FIG. 16.

Figure 17:
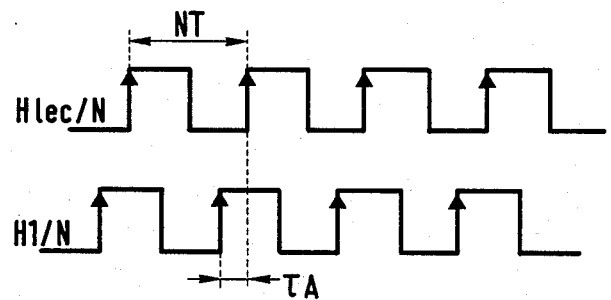

In case A, as shown in FIG. 17, the clock Hlec/N is to lag behind the clock H1/N by one bit. This delay is $\tau A$, and with T being the period of Hlec, we have $\tau A = T$.

Figure 18:
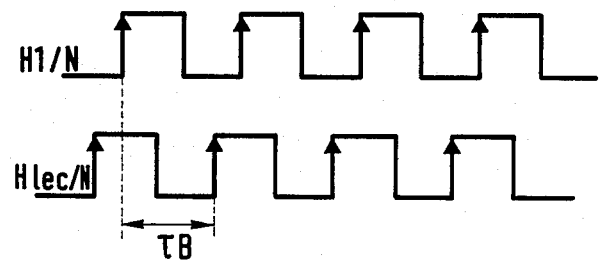

In case B, as shown in FIG. 18, the read clock Hlec/N is to lag behind H1/N by N−1 bits. Thus $\tau_B = T(N-1)$. The phase jump is thus $\Delta\phi = 2\pi(N-2)/N$ between $2\pi/N$ and $2\pi(N-1)/N$.

Figure 19:
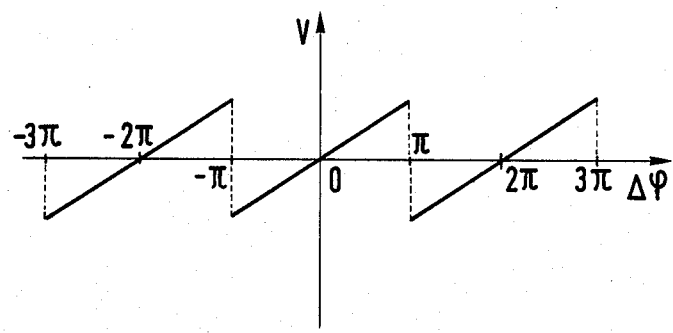

In order to do without a signal indicating the direction in which the phase offset is to be taken up between the synchronization logic and the phase comparator, the phase jumps can be split up into small successive phase jumps with $\Delta\phi i < \pi$, or else a comparator can be used which accepts phase jumps of $\Delta\phi = 2\pi(N-2)/N$ over the range $2\pi/N$ to $2\pi(N-1)/N$ as shown in FIG. 19.

Apparatus in accordance with the invention thus has the major advantage of providing a wide synchronization range with a synchronization search time which includes the time required to integrate phase jumps by means of a phase lock loop, in particular.

Naturally, the present invention is described and shown solely by way of preferred example and its various component items could be replaced by equivalent items without thereby going beyond the scope of the invention.

I claim:

1. Apparatus for implementing the method of synchronizing two binary trains in order to switch from the first train to the second making use of a synchronization range which extends between a first position in a buffer memory storing the train which is directed to the output and for which reading follows writing by one bit period (case A), and a second position where reading precedes writing by one bit period (case B), said apparatus comprising:

two buffer memories having N positions each and in which the two trains are stored;

two write inhibit devices in said memories;

a synchronizing logic circuit;

a phase lock loop which includes a phase comparator, a low pass filter, a voltage controlled oscillator, and a divide-by-N circuit fed back to a first input of the phase comparator, with the second input of the comparator being connected via a first switch to one of the clocks associated with the two trains after passing through respective divide-by-N circuits;

an exclusive-OR gate for bit-by-bit comparison of the binary trains and receiving on its inputs the binary trains read from the two buffer memories; and having its output connected to said synchronization logic circuit; and a second switch for directing one of said trains as read to the output;

said synchronization logic being connected to both write inhibit devices, to both switches, and also to said phase comparator.

2. Apparatus according to claim 1, wherein a first adjustable delay device is disposed between the first switch and the first input to the phase comparator, and in that a second adjustable delay device is disposed between the divide-by-N circuit and the second input to the phase comparator, with the synchronization logic circuit being connected to both delay devices.

3. Apparatus according to claim 2, wherein the phase comparator has a response curve $V=f(\Delta\phi)$ which ranges from 0 to $2\pi$.

4. Apparatus according to claim 2, wherein the phase comparator has a response curve $V=f(\Delta\phi)$ which ranges from $-\pi$ to $+\pi$.

5. Apparatus according to claim 1, wherein a single variable delay device is disposed between the divide-by-N circuit and the second input to the phase comparator, with the synchronization logic circuit being connected to said delay device.

6. Apparatus according to claim 5, wherein the phase comparator has a response curve $V=f(\Delta\phi)$ which ranges from $-2\pi$ to $+2\pi$.

7. A method of synchronizing two binary signal trains in order to switch from the first train to the second train, wherein at least the first binary signal train is obtained by first writing an input signal into a buffer memory in response to a write signal and then reading signals out of said buffer memory in response to a read signal, said method further including the step of adjusting a phase relationship between said read signal and said write signal.

8. A method according to claim 7, comprising the step of first adjusting the timing of said second signal train in an attempt to obtain synchronization, and if unsuccessful then adjusting the phase relationship of the read and write signals.

9. A method according to claim 7, including the following steps:

generating said read signal in accordance with a phase comparison between the read and write signals in a phase comparator, said comparison taking place in a state where reading follows or precedes writing by one bit position in the buffer memory;

comparing said first and second signal trains to determine if synchronization exists;

seeking synchronization by inhibiting the second signal train or by modifying said phase comparator to adjust the phase of the read signal relative to the write signal, and returning to the previous step; and switching from the first signal train to the second signal train if synchronization is obtained after N shifts in the buffer memory.

10. A method according to claim 9, wherein switching takes place from the first train to the second train if synchronization is not found after searching for a determined length of time.

* * * * *